June 9, 1931.  F. X. LA CHALL  1,809,244
SPRING LEAF LUBRICATOR
Filed May 11, 1927  2 Sheets-Sheet 1
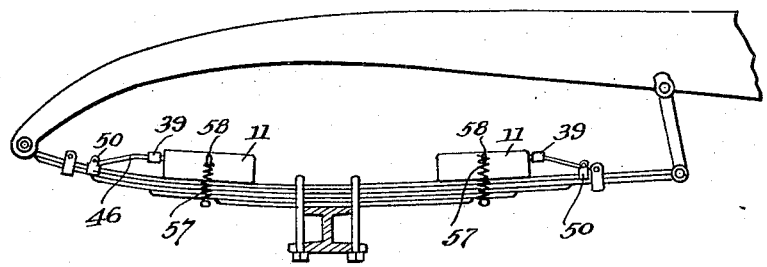
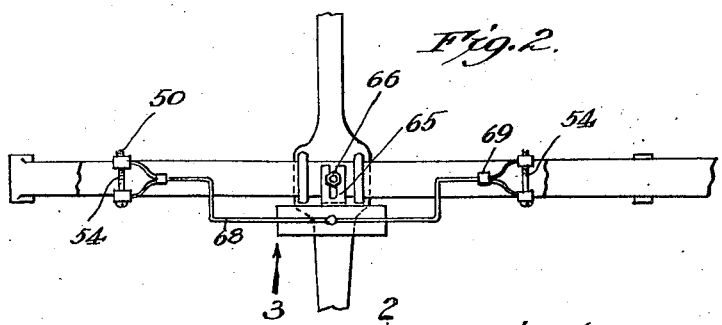
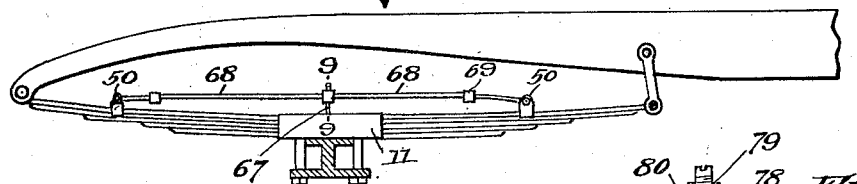
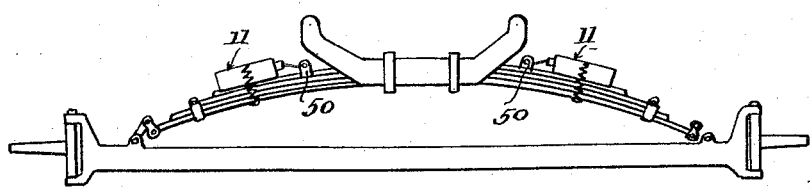
Inventor
Francis X. La Chall,
by Hazard and Miller
Attys.

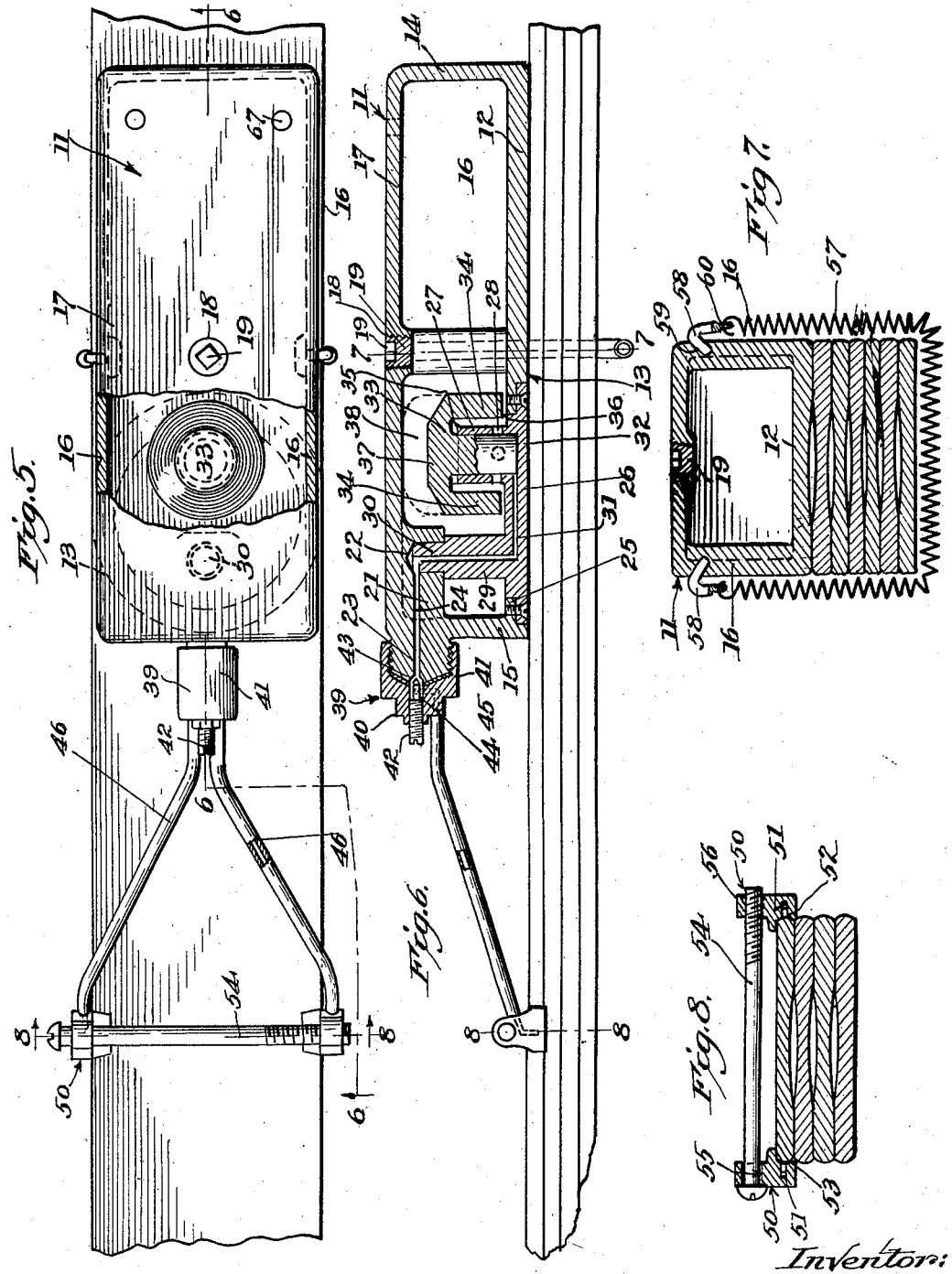

Patented June 9, 1931

1,809,244

UNITED STATES PATENT OFFICE

FRANCIS X. LA CHALL, OF LOS ANGELES, CALIFORNIA

SPRING LEAF LUBRICATOR

Application filed May 11, 1927. Serial No. 190,464.

My invention is a spring leaf lubricator for automobiles or the like to lubricate the leaf springs in accordance with the action the leaves undergo.

An object of my invention is a spring leaf lubricator for automobile or other spring leaves which are subject to vibration, bumping or shaking and the like, of such a character that the lubricant is fed to the leaves in accordance with the amount of action of the leaf spring. That is on a bumpy road a greater amount of lubricant is fed to the springs than on a smooth road, or if a relatively smooth road is traveled at high speed a greater amount of lubricant will be distributed over the leaves of the spring than the same road taken at slow speed in which there is very little spring action.

Another object of my invention is a spring leaf lubricator which may be clamped to the spring itself or to a part of the structure of the vehicle, such as the axle, which has a relative movement with the spring in relation to the frame of the vehicle.

Another object of my invention is a spring leaf lubricator having a pump type of device which, due to the bouncing and vibration of the leaves of the spring, pumps oil from a receptacle through suitable conduits or ducts to the spring leaves, over and between which the oil is thence distributed.

Another object of my invention is the construction of a lubricator with a receptacle having a vibration or bump actuated pump which may be readily disassembled and assembled and also having a control valve by which the amount of lubricant passing to the springs may be regulated.

In constructing my invention I have a receptacle with means to attach same to the springs of a vehicle, or to some other structure such as the axle, this receptacle having a small pump cylinder therein and a plunger operating in such cylinder, the plunger being connected or constructed integral with a weight, which weight may bounce up and down due to the vibration or spring action and pump oil from the receptacle through a duct, which duct is connected by flexible tubes to distributing outlets. These outlets are clamped to the sides of a leaf of a spring and the oil distributed between such leaves.

My invention in its various aspects and installations is illustrated in the accompanying drawings, in which:

Figure 1 shows a semi-elliptic spring over hung on the axle, with a pair of my lubricators connected thereto.

Figure 2 is a plan view of another type of installation, as if taken in the direction of the arrow 2 of Fig. 3, showing the lubricator receptacle clamped to the axle or to a bracket, securing the spring to the axle, with flexible tubes carrying the oil to opposite ends of a semi-elliptical spring.

Figure 3 is a side elevation of the installation of Fig. 2 taken in the direction of the arrow 3, with the axle shown in section.

Figure 4 is an elevation illustrating the attachment of my lubricator to a semi-elliptic transverse spring.

Figure 5 is a plan view, partly broken away, showing the receptacle, the tubes leading to the springs, and the nozzles or outlets attached to a leaf.

Figure 6 is a longitudinal section taken on the line 6—6—6 of Fig. 5 in the direction of the arrows.

Figure 7 is a transverse section on the line 7—7 of Figs. 5 and 6 showing the attaching spring in elevation.

Figure 8 is a transverse section on the line 8—8 of Figs. 5 and 6, showing the outlets or nozzles as attached to a spring.

Figure 9 is a detail section on the line 9—9 of Fig. 3.

The oil receptacle is constructed substantially as follows, having reference particularly to Figs. 5, 6 and 7:

Such receptacle is designated generally by the numeral 11 and has a base 12 with a large, preferably circular, opening 13 therein. Formed integral with the base are end walls 14 and 15 and opposite side walls 16. The top 17 is formed integral with the side and end walls and has a filling opening 18 therethrough, closed by a plug 19.

A block 21 is formed preferably integral with the top and the end 15 and has a recess 22 therein, and projecting from the end 15 there is a screw threaded spigot 23. An oil duct 34 extends through the block 21, the end wall 15, and the spigot 23. The opening in the base is preferably formed angular, having an inwardly projecting rim 25.

The receptacle is closed at the base by a closure plate 26 having peripheral edges formed with angles to conform to the edges of the opening 13 and the rim 25. A pump barrel 27 is formed integral with the closure plate 26 and has one or more inlet ports 28 preferably slightly above its base. A lug 29 extends upwardly from the closure plate and has a plug 30 fitting in the recess 22. There is an oil duct 31 extending from the base of the pump barrel below the inlet ports 28, which base has its bottom 32 below the bottom of the inside of the base 12 and the inside of the closure plate 26. This oil duct extends upwardly through the lug 29 and the plug 30, discharging into the upper part of the recess 22.

A cylindrical plunger 33 fits in the pump barrel and has annular weights 34 connected thereto, these being spaced from the plunger by a deep vertical groove 35. The groove 35 is of sufficient width to leave a clear oil space on the outside of the pump barrel 27 and there is a clearance space 36 between the lower ends of the weights and the top surface of the closure plate 26 and the base 12 of the receptacle. The top 37 of the combined pump plunger 33 and the weights 34 is spaced a sufficient distance 38 from the top 17 of the receptacle so that in the upward position of the plunger, as shown dotted in Fig. 6, the plunger will still be retained in the pump barrel but above the ports 28. The top 37 of the plunger 33, is tapered, producing in effect a more or less stream-line shape to which the oil offers less resistance as the plunger moves upwards, than were the top of the plunger perfectly flat.

A controlling valve assembly 39 is formed by securing a valve structure 40 on the spigot 23 by means of a coupling 41. A stem 42 is screw threaded through the valve structure and has a needle point adapted to seat against the valve seat 43 on the end of the spigot. An enlarged chamber 44 is formed back of the needle point of the valve which functions as an air space in operation and from this space ducts 45 extend to the flexible oil pipes 46. The point of entrance of the ducts 45 into the chamber 44, is lower than that at which the duct 31 enters the chamber, with the result that the oil that is forced past the needle valve, will fall by gravity to a position from which it will flow into the ducts 45 and thus avoid being drawn back into the duct 31 when the plunger starts its return stroke.

These oil pipes 46 lead to oil distributors 50, each distributor having a duct 51 therethrough which leads to an outlet 52 on a curved side surface 53 of such outlet or nozzle, this surface being shaped to fit the side edge of a leaf of a spring, as indicated in Fig. 8. The distributors or nozzles 50 are clamped to the spring by means of a clamp bolt 54, this bolt having a passage 55 through one of the distributors and being threaded in the other distributor 56.

If the oil receptacle with its internal pump is to be clamped to a spring, I preferably utilize a coiled tension spring 57, which is secured to hooks 58 which may be welded to the side walls of the receptacle fitting in holes 59 or if desired these hooks may fit loosely in the holes 59, the attachment being as illustrated in detail in Figs. 5 through 7 and in assembly as in Figs. 1 and 4, the ends of the springs engaging through eyes 60 on the hooks.

The manner of operation and functioning of my spring leaf lubricator as thus described is substantially as follows:

After attachment to a spring the receptacle may be filled by removing the filling plug 19 and as the spring works up and down, due to the bumps on the road, the weighted plunger is given an up and down motion, this motion being limited by the top of the receptacle, and on the upward movement oil flows through the ports 28 into the pump barrel and on the downward stroke, due to the weight of the plunger, the oil is forced out of the bottom of the barrel through the duct 31. It will be seen that on the down stroke if the plunger is thrown upwardly to its full extent, some of the oil will be forced from the barrel backwardly through the ports 28 into the receptacle and only the oil below the ports will be forced through the duct 31, which leads through the lug 29 and communicates the oil to the duct 24. The valve 39 may be regulated by screwing the valve stem 42 in or out to regulate the opening between the needle valve and the seat for such valve. From this valve the oil is carried by the distributing tubes 49 to the distributors or nozzles 50. These distributors preferably lead the oil to the upper leaf of the spring and to a high point on the spring proper, and from such leaf the oil seeps lengthwise between the upper leaf and the leaf next thereto and becomes distributed between all the leaves of the spring.

From the above it will be seen that the lubrication of the spring is dependent on the spring action, that is if the road is very bumpy the pump plunger is violently shaken up and down, pumping a considerable amount of oil, whereas if the road is smooth or a rough road is taken at slow speed the action is much less and a lesser quantity of oil is distributed. Hence it will be seen that I have not only developed an appliance but also a method of lubricating leaf springs in which the amount of oil corresponds to the requirements of the spring and gives more oil for a large spring action and little oil for a small spring action.

When my lubricator is utilized in a connection, such as shown in Figs. 2 and 3, the receptacle may be secured over the axle by means of a plate 65 secured by a bolt 66 to the spring. In this system the outlet 67 from the lubricator is preferably centrally located and extends upwardly but otherwise may be similar to the valve assembly 39, the spigot being on top of the receptacle. The flexible pipes 68 are connected to the side of the outlet and extend to the distributors 50 attached to the springs, there being a Y connection 69. By this layout the oil is equally distributed to the front and the back of the spring.

The action of the lubricator as installed in Figs. 2 and 3 is substantially the same as when installed directly on the spring. This installation is suitable where there is insufficient space between the top of the spring and the bottom of the frame. When the receptacle is attached directly to the axle it is subject, however, more directly to the road shocks than when mounted on the spring and it may be necessary to adjust the valve slightly closer to restrict the flow of oil.

Although I have shown my lubricator as attached to semi-elliptic springs, it is to be understood that it may be utilized substantially as effectively on the cantilever type of spring and on three-quarter or full elliptic springs, or any other type of leaf spring construction, and for lubricating springs for any purpose in which they are subject to vibration or the receptacle will be subject to shock.

In Fig. 9 I illustrate a discharge arrangement from the center of the oil receptacle, suitable for discharging the oil, as shown in Figs. 2 and 3, to opposite ends of the spring. In this case a lug 75 extends upwardly from the base 12 of the receptacle and fits into a recess 76 in the top 17. A spigot 77 is threaded through the top 17 of the receptacle and has a cup structure 78 secured adjacent the upper end of such spigot. A needle valve 79 is threaded through the closure plate 80 of this cup, the valve having a seat 81 in the spigot, closing the oil duct 82 which leads from the oil duct 83 in the lug 75 to the valve. The oil fills this cup above the discharge pipe 68 and on account of the bottom of the cup being below the top of the spigot, the oil does not back flow from the springs or the pipes 68 to the oil receptacle.

Various changes may be made in the principles of my invention without departing from the spirit thereof, as set forth in the description, drawings and claims.

I claim:

1. A spring lubricator, comprising in combination a receptacle, a pump barrel having ports leading therefrom into said receptacle, a pump plunger slidable in said barrel and adapted to be reciprocated therein by its own inertia when the barrel is vibrated, a distributor, means for attaching said distributor to a spring, oil ducts leading from the barrel to said distributor, a portion of said oil duct being disposed at as great an elevation as the highest oil level in said receptacle, said pump barrel being of cylindrical configuration and said plunger fitting therein, a weight on said plunger, said weight having an annular groove in which the pump barrel is disposed, and means for limiting the movement of said plunger.

2. A spring lubricator comprising in combination, an oil receptacle having an opening in the base, a closure plate associated with said opening, a pump barrel mounted on said closure plate and having ports therein leading into said receptacle, a weighted pump plunger slidable in said barrel, means for restricting the movement of said plunger, a lug connected to said closure plate and fitting within a recess in said receptacle, an oil duct from the pump barrel through said lug to said recess, an oil distributor, means for attaching said distributor to a spring, and a second duct leading from said recess to said distributors.

3. A spring lubricator as set forth in claim 2, a spigot associated with said receptacle, said second duct leading through said spigot, valve means carried by said spigot and controlling the flow through said second duct.

4. A spring lubricator comprising in combination, an oil receptacle having a flat base with an opening therein, a closure plate for said opening, a cylindrical pump barrel carried by said closure plate and having ports through the base thereof leading into the receptacle, a pump plunger slidable in said barrel, an annular weight connected to said plunger and separated from the plunger proper by a groove in which said pump barrel fits, a lug connected to said closure plate and fitting in a recess in the top of said receptacle, a duct leading from the pump barrel to said recess through said lug, the top of the receptacle forming a limiting means for the upstroke of said plunger, oil distributors, means for clamping said distributors to a spring, tubes leading from said distributors to said duct, and a valve controlling flow into said tubes.

In testimony whereof I have signed my name to this specification.

FRANCIS X. LA CHALL.